(12) United States Patent
Felix et al.

(10) Patent No.: US 6,592,162 B2
(45) Date of Patent: Jul. 15, 2003

(54) APPARATUS FOR INCREASING TRUCK BED CARGO SPACE

(76) Inventors: Rosario Ruelas Felix, 807 Sheffield Pl., Thousand Oaks, CA (US) 91360;
Rafaela Ruelas Felix, 807 Sheffield Pl., Thousand Oaks, CA (US) 91360

( * ) Notice: Subject to any disclaimer, the term of this patent is extended or adjusted under 35 U.S.C. 154(b) by 0 days.

(21) Appl. No.: 09/878,063

(22) Filed: Jun. 7, 2001

(65) Prior Publication Data

US 2001/0050489 A1 Dec. 13, 2001

Related U.S. Application Data

(60) Provisional application No. 60/209,955, filed on Jun. 8, 2000.

(51) Int. Cl.$^7$ .................................................. B60P 3/00
(52) U.S. Cl. ............................................. 296/3; 296/36
(58) Field of Search ................................ 296/3, 6, 7, 8, 296/9, 36, 42, 41

(56) References Cited

U.S. PATENT DOCUMENTS

| | | | |
|---|---|---|---|
| 683,452 A | * 10/1901 | Eral | |
| 1,116,052 A | * 11/1914 | Gagnon | 296/6 |
| 1,402,988 A | * 1/1922 | Willour | |
| 1,652,069 A | * 12/1927 | Travis, Jr. | |
| 1,717,184 A | * 6/1929 | Browne | 296/24.1 |
| 1,905,009 A | * 4/1933 | Standish | 296/3 |
| 2,324,508 A | * 7/1943 | Johnson | |
| 2,836,455 A | * 5/1958 | Hathaway | 280/147 |
| 4,138,046 A | * 2/1979 | De Freze | 211/182 |
| 4,509,787 A | * 4/1985 | Knaack et al. | 211/182 |
| 4,703,969 A | 11/1987 | Rayburn et al. | |
| 4,779,916 A | * 10/1988 | Christie | 296/3 |
| 5,480,180 A | * 1/1996 | Fuller et al. | 296/36 |
| 5,634,681 A | * 6/1997 | Gionta | 108/44 |
| 5,662,254 A | * 9/1997 | Lemajeur et al. | 296/3 |
| 5,752,734 A | 5/1998 | Ward et al. | |
| 5,829,812 A | 11/1998 | Gionta | |
| 6,152,510 A | * 11/2000 | Newsome | 296/10 |

* cited by examiner

*Primary Examiner*—D. Glenn Dayoan
*Assistant Examiner*—Lori L Coletta
(74) *Attorney, Agent, or Firm*—Matthew J. Peirce

(57) ABSTRACT

The present invention concerns that of a new and improved apparatus used to increase the capacity of a pickup truck bed. The apparatus comprises a trio of extensions that can be used on both sides of the pickup truck bed. The extensions would be mounted to the internal sides of the pickup truck bed and could be extended to different heights to accommodate a larger or smaller load. The present invention would come in different lengths for short bed and long bed pickups.

3 Claims, 1 Drawing Sheet

APPARATUS FOR INCREASING TRUCK BED CARGO SPACE

This application claims benefit of Prov. Appl. No. 60/209,955 filed Jun. 8, 2000.

I. BACKGROUND OF THE INVENTION

The present invention concerns that of a new and improved apparatus used to increase the capacity of a pickup truck bed.

II. DESCRIPTION OF THE PRIOR ART

U.S. Pat. No. 5,829,812, issued to Gionta, discloses a truck-mounted work station that includes a frame forming an open rack for tools and supplies, and pivot arms extending from the frame to support a work table or the like.

U.S. Pat. No. 5,752,734, issued to Ward et al., discloses a rail component for pick-up and flat-bed trucks to support side or back pieces comprising a plurality of vertically disposed support rails positioned around the periphery of a rear portion of a truck.

U.S. Pat. No. 4,703,969, issued to Rayburn et al., discloses a cargo space increasing assembly for use with a pickup truck bed.

III. SUMMARY OF THE INVENTION

The present invention concerns that of a new and improved apparatus used to increase the capacity of a pickup truck bed. The apparatus comprises a pair of extensions that can be used on both sides of the pickup truck bed. The extensions would be mounted to the internal sides of the pickup truck bed and could be extended to different heights to accommodate a larger or smaller load. The present invention would come in different lengths for short bed and long bed pick-ups.

There has thus been outlined, rather broadly, the more important features of an apparatus for increasing the capacity of a truck bed in order that the detailed description thereof that follows may be better understood and in order that the present contribution to the art may be better appreciated. There are, of course, additional features of the apparatus for increasing the capacity of a truck bed that will be described hereinafter and which will form the subject matter of the claims appended hereto.

In this respect, before explaining at least one embodiment of the apparatus for increasing the capacity of a truck bed in detail, it is to be understood that the apparatus for increasing the capacity of a truck bed is not limited in its application to the details of construction and to the arrangements of the components set forth in the following description or illustrated in the drawings. The apparatus for increasing the capacity of a truck bed is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present apparatus for increasing the capacity of a truck bed. It is important, therefore, that the claims be regarded as including such equivalent constructions insofar as they do not depart from the spirit and scope of the present invention.

It is therefore an object of the present invention to provide an apparatus for increasing the capacity of a truck bed which has all of the advantages of the prior art and none of the disadvantages.

It is another object of the present invention to provide an apparatus for increasing the capacity of a truck bed which may be easily and efficiently manufactured and marketed.

It is another object of the present invention to provide an apparatus for increasing the capacity of a truck bed which is of durable and reliable construction.

It is yet another object of the present invention to provide an apparatus for increasing the capacity of a truck bed which is economically affordable and available for relevant purchasing government entities.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Figure 1:
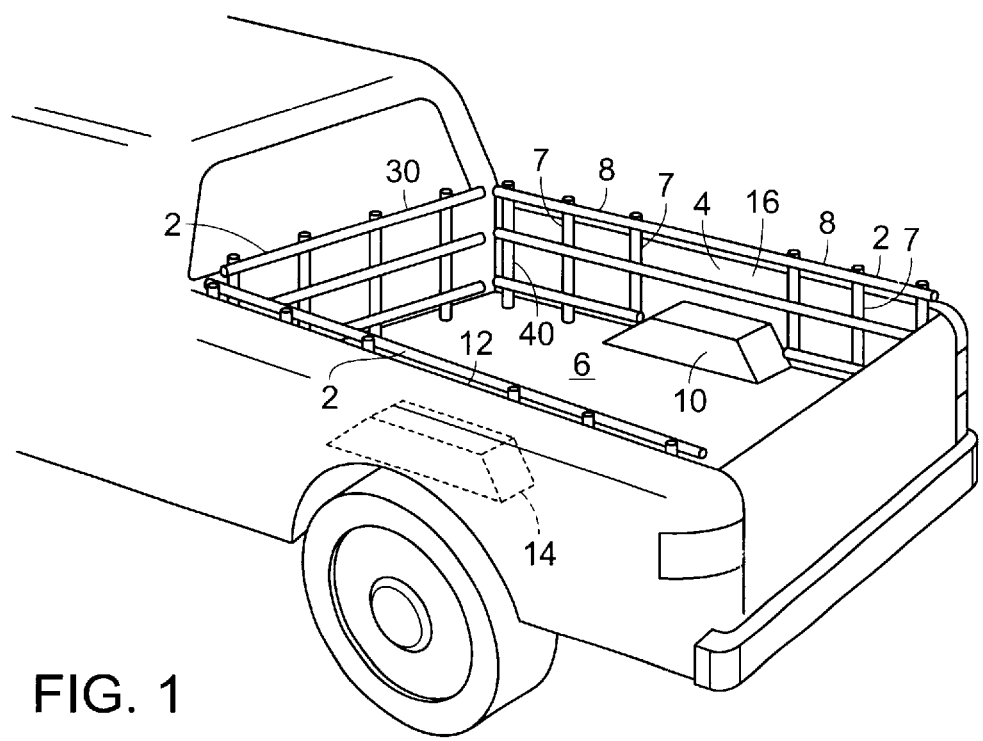
FIG. 1 shows a perspective view of the present invention in the "down" position.

FIG. 1 shows a perspective view of the present invention in the "down" position. Extension 2 is seen attached to the right inside wall 4 of a pickup truck bed 6. As can be seen, extension 2 is fabricated from a plurality of vertical rods 7 and sticks 8. Each vertical rod 7 would have two ends, a first end and a second end, with the second end of each vertical rod being inserted through the bottom of the truck bed. The first end of each vertical rod 7 would, while extension 2 is in a "down" position, be approximately the same height as the top of the side panels in the truck bed 6. A supporting leg 40 would house each vertical rod 7 when the vertical rod would be in a down position.

The sticks 8 used in the present invention would be used to connect adjacent vertical rods 7 to one another. Hook 32 can be seen attached to the right inside wall 4. Alternatively, a snap could be used in lieu of hook 32. When in a heightened position, one of the horizontal rods of the extension 2 would be placed within the hook 32. In addition, some sticks 8 would be used for vertical uses over the wheel wells 10 and 14, where a vertical rod 7 could not be used.

Although not seen in FIG. 1, there would also be an extension 2 attached to the left inside wall 12 of pickup truck bed 6. Extension 2 attached to the left inside wall 12 of pickup truck bed 6 would be a mirror image of the extension 2 on the right inside wall 4 of pickup truck bed 6.

Also, the present invention would include rear window extension 30, which when raised, would cover the rear window of the cabin of the pickup truck. Although not necessary for structural support, extension 30 would serve to protect the cabin rear window should a user need to use both extensions 2 in the pickup truck bed 6. In any regard, extension 30 would be connected to both extensions 2 and would automatically be raised when a user would raise extensions 2.

Figure 2:
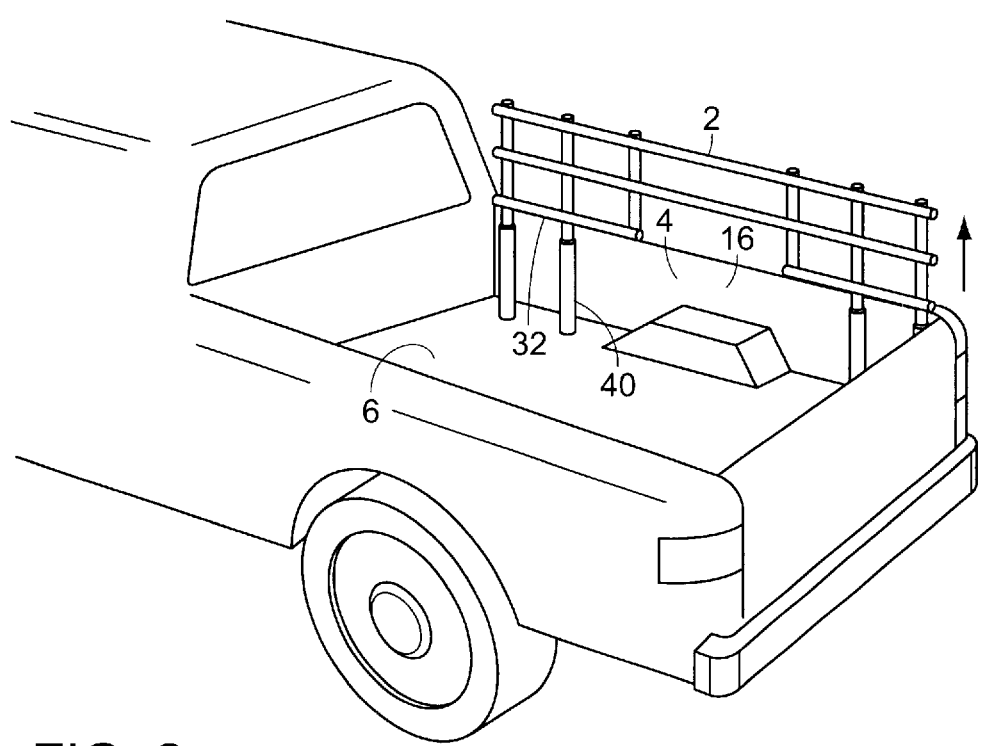
FIG. 2 shows a perspective view of the present invention in the "up" position.

FIG. 2 shows a perspective view of the present invention in the "up" position. The supporting legs of extension 2 attached to the right inside wall 4 of pickup truck bed 6 can be seen to be extended, which would force extension 2 to rise above the level of the rim of right wall 16 of pickup truck bed 6. Extension 2 could then be locked in this extended position by locking means, which would be at least one hook or snap located on the side wall of a truck, allowing pickup truck bed 6 to have a larger carrying capacity due to the increase in side wall height. Hook 32 can be seen attached to the right inside wall 4. Alternatively, a snap could be used in lieu of hook 32. When in a heightened position, one of the horizontal rods of the extension 2 would be placed within the hook 32.

Extension 2 would be designed in different lengths, depending on whether extension 2 would be designed for use with a short bed or long bed pickup truck. The crucial determining factor as to the height of extension 2 would be the height of the vertical rods 7 and the number of horizontal rows of sticks 8 that would be present.

What is claimed is:

1. An apparatus for increasing truck bed cargo space comprising:
   (a) a left extension including
      (i) at least four vertical support rods including a first pair of support rods and a second pair of support rods, the first pair of support rods located in front of a left wheel well in a truck bed flush with a left side wall of the truck bed, the second pair of support rods located in back of the left wheel well in the truck bed flush with the left side wall of the truck bed, each vertical support rod having two ends, a first end and a second end, the second end of each vertical support rod being inserted through the floor of the truck bed,
      (ii) a plurality of sticks connecting the vertical support rods to one another, the plurality of sticks being aligned in a series of horizontal rows of sticks, the lowest horizontal row of sticks serving as a base when the apparatus would be in a lowered position, the highest row of sticks attached to the first end of each of the vertical support rods,
   (b) a right extension including
      (i) at least four vertical support rods including a first pair of support rods and a second pair of support rods, the first pair of support rods located in front of a right wheel well in the truck bed flush with the right side wall of the truck bed, the second pair of support rods located in back of the right wheel well in the truck bed flush with the right side wall of the truck bed, each vertical support rod having two ends, a first end and a second end, the second end of each vertical support rod being inserted through the floor of the truck bed,
      (ii) a plurality of sticks connecting the vertical support rods to one another, the plurality of sticks being aligned in a series of horizontal rows of sticks, the lowest horizontal row of sticks serving as a base when the apparatus would be in a lowered position, the highest row of sticks being attached to the first end of each of the vertical support rods,
   (c) a rear window extension comprising:
      (i) at least two vertical support rods including a first support rod and a second support rod, each vertical support rod having two ends, a first end and a second end, the second end of each vertical support rod being inserted through the floor of the truck bed flush with the front side wall of the truck that would be a rear of a cabin of the truck,
      (ii) a plurality of sticks connecting the vertical support rods to one another, the plurality of sticks being aligned in a series of horizontal rows of sticks, the lowest horizontal row of sticks serving as a base when the apparatus would be in a lowered position, the highest row of sticks being attached to the first end of each of the vertical support rods,
      (iii) whereby the rear window extension would be connected to the left extension and the right extension, and
   (d) locking means for maintaining the apparatus in a raised position.

2. An apparatus for increasing truck bed cargo space according to claim 1 wherein the locking means for maintaining the apparatus in a raised position comprises at least three hooks, a first hook, second hook, and a third hook, the first hook being attached to the left side wall of the truck bed, the second hook being attached to the right side wall of the truck bed, the third hook being attached to the front side wall of the truck bed, whereby a user could place a row of horizontal sticks within all three hooks, allowing the apparatus to maintain a certain height.

3. An apparatus for increasing truck bed cargo space according to claim 1 wherein the locking means for maintaining the apparatus in a raised position comprises at least three snaps, a first snap, second snap, and a third snap, the first snap being attached to the left side wall of the truck bed, the second snap being attached to the right side wall of the truck bed, the third snap being attached to the front side wall of the truck bed, whereby a user could place a row of horizontal sticks within all three snaps, allowing the apparatus to maintain a certain height.

\* \* \* \* \*